(12) United States Patent
Hawker et al.

(10) Patent No.: US 12,277,625 B2
(45) Date of Patent: *Apr. 15, 2025

(54) MASKING AND COMPOSITING VISUAL EFFECTS IN USER INTERFACES

(71) Applicant: Microsoft Technology Licensing, LLC, Redmond, WA (US)

(72) Inventors: Michael Andrew Hawker, Duvall, WA (US); Christopher Recarlo Blackman, Irvington, NJ (US); Xin Liu, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/429,189

(22) Filed: Jan. 31, 2024

(65) Prior Publication Data

US 2024/0169605 A1    May 23, 2024

Related U.S. Application Data

(63) Continuation of application No. 17/578,056, filed on Jan. 18, 2022, now Pat. No. 11,922,542.

(51) Int. Cl.
*G06T 11/40*    (2006.01)
*G06T 11/00*    (2006.01)

(52) U.S. Cl.
CPC ............ *G06T 11/001* (2013.01); *G06T 11/40* (2013.01)

(58) Field of Classification Search
CPC ... G06T 11/001; G06T 11/40; G06T 2200/24; G06T 15/60; G06F 3/048
See application file for complete search history.

(56) References Cited

U.S. PATENT DOCUMENTS

| | | | |
|---|---|---|---|
| 7,432,939 B1 * | 10/2008 | Platzer | G06T 11/00 715/823 |
| 7,702,131 B2 * | 4/2010 | Chinen | H04N 5/2625 348/94 |
| 7,777,758 B2 * | 8/2010 | Yhann | H04N 1/58 345/592 |
| 11,922,542 B2 * | 3/2024 | Hawker | G06T 11/40 |
| 2016/0259532 A1 * | 9/2016 | Chen | G06T 11/60 |
| 2021/0134049 A1 * | 5/2021 | Sugano | H04N 19/597 |

* cited by examiner

*Primary Examiner* — Antonio A Caschera

(57) ABSTRACT

Computer-implemented systems and methods for rendering a visual effect on a graphical element, including: generating an initial visual effect based on the graphical element; computing a mask shape based on the graphical element; generating a mask based on the mask shape from the graphical element; masking the initial visual effect based on the mask to generate a masked visual effect; and combining the masked visual effect with the graphical element into a combined graphical element and visual effect.

20 Claims, 13 Drawing Sheets

MASKING AND COMPOSITING VISUAL EFFECTS IN USER INTERFACES

CROSS-REFERENCE TO RELATED APPLICATIONS

This application is a continuation of U.S. patent application Ser. No. 17/578,056 filed Jan. 18, 2022, entitled "Masking and Compositing Visual Effects in User Interfaces," which is incorporated herein by reference in its entirety.

BACKGROUND

In computer graphics, a drop shadow is a visual effect where a graphical element gives the impression of a shadow that is cast by an associated graphical element. In the concrete example of a graphical user interface, a window within the user interface may cast a drop shadow onto user interface elements behind it, such as other windows or an underlying "desktop." In addition, user interface elements (e.g., buttons, icons, cards, tiles) within the application window may cast drop shadows on elements within the same application window. This drop shadow gives the impression that the graphical element casting the shadow is raised above the objects behind it, for example, giving the impression that various windows in a user interface are stacked on top of one another or that some user interface elements are raised above other user interface elements (e.g., selected items appear to be raised over non-selected items).

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of the present technology relate to systems and methods for generating drop shadows and similar visual effects for a graphical element. In some examples, drop shadows are generated for, and attached to, a graphical element in a manner that is computationally efficient during rendering of a graphical user environment (e.g., a desktop user interface shell and/or an application window within the user interface). In some examples, the graphical element is a window of a desktop shell environment. In some examples, the graphical element is a user interface element (e.g., a button, a tile, a card) within an application window. However, aspects of the present technology are not limited thereto and are applicable anywhere inside an application window and/or associated with an application window, including the "chrome" or "decoration" of the application window. In some examples, the graphical element and its associated drop shadow are composited into a single (or same) layer of a two-dimensional (2D) graphics environment, thereby reducing or avoiding the overhead associated with managing multiple and/or additional layers for rendering the visual effects attached to the graphical element.

In addition, some aspects of the present disclosure relate to techniques for rendering a visual effect, such as a drop shadow, for a corresponding transparent or translucent graphical element (e.g., a graphical element having full or partial transparency or translucency effects, such that graphical elements on layers behind the graphical element may otherwise be visible through the graphical element) in a manner such that the visual effect (e.g., the drop shadow) is not visible through the graphical element. In more detail, some aspects of the technology relate to automatically generating a mask based on a shape or outline of the graphical element and using the mask to remove portions of the visual effect that overlap with the graphical element, then compositing the masked visual element (e.g., a masked drop shadow) with the graphical element on a single layer, which is then rendered in a graphical environment such as a desktop window environment or shell, within a window of an application, or in another manner.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1:
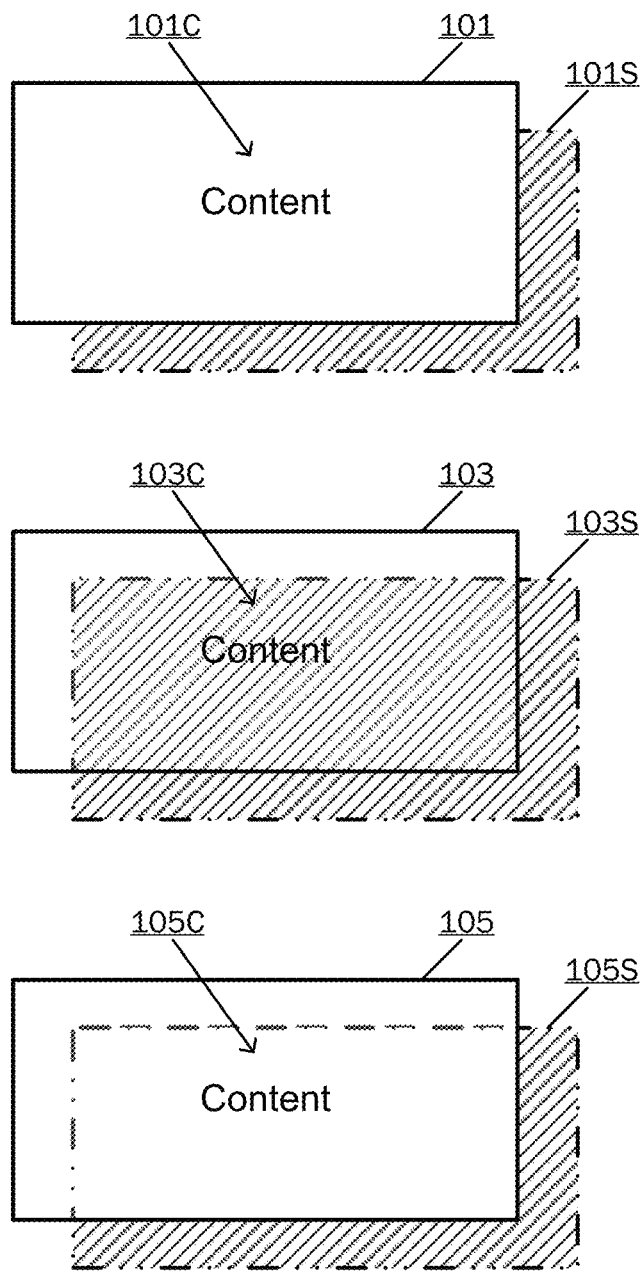
FIG. 1 illustrates examples of drop shadows of graphical elements generated based on different approaches.

The following detailed description refers to the accompanying drawings. Wherever possible, the same reference numbers are used in the drawing and the following description to refer to the same or similar elements. While aspects of the present technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Adding drop shadows or other visual effects in graphical user interfaces of applications and graphical desktop environments generally involves composing multiple layers of graphical elements to produce the desired effect. For example, a foreground element (a first graphical element on a first layer) may cast a shadow (a second graphical element) onto a background element on a backdrop plane (a second layer). FIG. 1 illustrates examples of drop shadows of graphical elements generated based on different approaches. For example, to create the shadow element 101S illustrated in FIG. 1, a rendering engine may draw the shadow element 101S first and then draw a foreground element 101 (e.g., containing content of interest such as text and/or images) on top of the shadow element 101S.

However, some software development toolkits for graphical user interfaces make it difficult to add a background element without making significant changes to the layout of an application. This can make it difficult for application developers to add drop shadow effects (or certain other visual effects) to their applications, particularly late in development. In addition, layering a transparent or translucent foreground element on top of a drop shadow generally causes the drop shadow to be visible through the foreground element, as shown in the case of a transparent or translucent foreground element 103 and its drop shadow 103S. For example, where the drop shadow 103S is drawn first and the translucent foreground element 103 is drawn on top of it, the appearance of the lower layer (e.g., drop shadow) may be combined with the upper layer in a manner that darkens the foreground element 103, which may change the appearance of the foreground content 103C, such as by also darkening the content in the foreground element or making the content more difficult to read. In contrast, the foreground element 101 shown in FIG. 1 is opaque and therefore completely obscures the portions of the shadow element 101S that overlap with the opaque foreground element 101. Thus, the content 101C is not affected by the drop shadow 101S.

To address these issues, among other things, aspects of examples of the present disclosure relate to generating visual effects, such as drop shadows, for graphical elements in a manner where the visual effect is attached directly to the foreground element associated with the visual effect (e.g., the foreground element casting a drop shadow), rather than to another layer. Accordingly, among other benefits, the layout of user interface elements in a graphical user interface of an application, or a desktop window manager or shell, or other graphical user interface may be simplified. In addition, some aspects of examples relate to generating a drop shadow 105S that is visible only outside the boundaries of its corresponding transparent or translucent foreground element 105 (e.g., by clipping or masking the drop shadow 105S), such that the drop shadow is not visible through the transparent or translucent foreground element 105, as illustrated in FIG. 1. As a result, the content 105C of the transparent or translucent foreground element 105 remains unmodified by the drop shadow 105S, in contrast to the appearance of the content 103C of a comparative example, while still showing user interface elements that are behind the transparent on translucent foreground element 105.

Figure 2A:
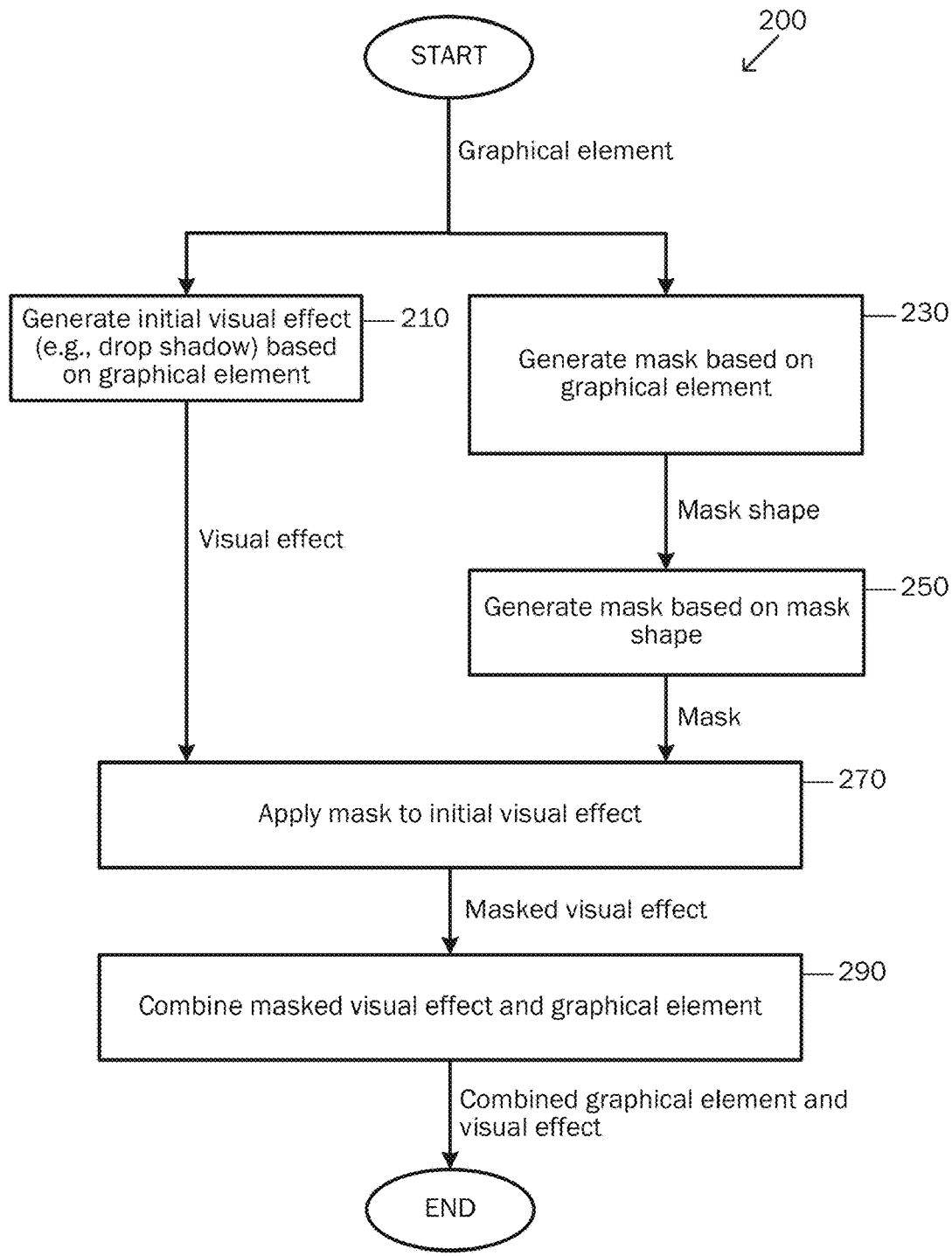
FIG. 2A is a flowchart depicting a method for generating a visual effect for a graphical element according to one example of the present disclosure.

FIG. 2A is a flowchart depicting a method 200 for generating a visual effect (e.g., a drop shadow) for a graphical element according to one example of the present disclosure. According to various examples, the method is performed by a rendering engine or other system configured to render graphical user interfaces and/or graphics, such as a window manager (e.g., the Desktop Window Manager (DWM) in Microsoft® Windows®, a window manager or display server such as X.org in a Unix-like system, or the Quartz® or Core Graphics software framework in Apple® MacOS® and iOS®) or a rendering engine running within an application (e.g., a rendering engine integrated into a web browser configured to render web pages encoded in hypertext markup language (HTML) and cascading style sheets (CSS) into 2D graphics). The rendering engine or other system may be implemented in software executed by a computing device, one example of which is described in more detail below with respect to FIG. 5. While various examples will be presented below in the context of methods being performed by a rendering engine, the disclosure is not limited thereto and may be implemented by other software, hardware, and/or firmware without deviating from the scope of the present disclosure.

Referring to FIG. 2A, a rendering engine generates a visual effect (e.g., a drop shadow) for a graphical element (e.g., a foreground graphical element) provided as input to method 200. In more detail, some examples of the present technology relate to using an expanded outline of the exterior boundary of the shape of the input graphical element to mask the visual effect (e.g., drop shadow) associated with the graphical element. The masked shadow effect is then combined (e.g., composited) with the graphical element to create the illusion of the same shadow effect without the need for a secondary layer.

Figure 3A:
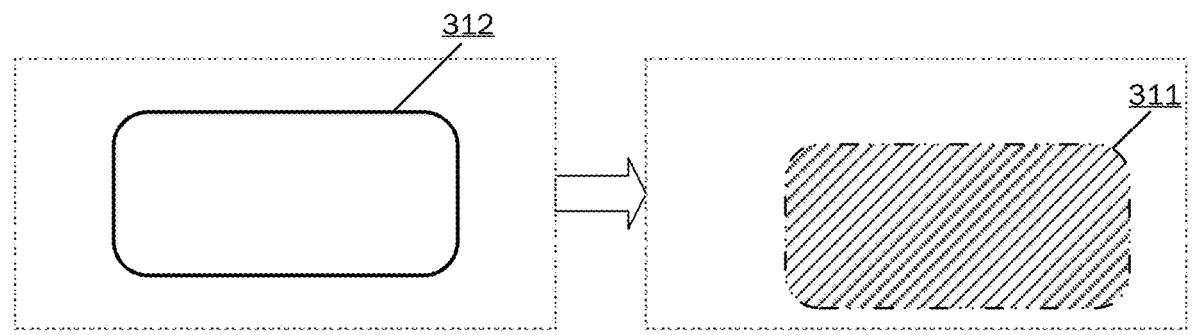
FIG. 3A illustrates generating a drop shadow corresponding to the graphical element according to one example of the present disclosure.

For example, in operation 210, the rendering engine generates a visual effect based on the input graphical element, such as corresponding to a shape of the input graphical element. FIG. 3A illustrates generating an initial drop shadow 311 as the visual effect corresponding to a shape of the input graphical element 312 according to one example of the present disclosure. In the example shown in FIGS. 3A-3H, the graphical element is shown as a rounded rectangle, although the present technology is not limited thereto. For example, the graphical element may have a rectangular shape with square corners (90° corners), or may have another shape with an outline in accordance with a geometric path defined by, for example, one or more line segments, one or more Bezier curves, or combinations of line segments and Bezier curves or an outline defined by a bitmap.

In the example shown in FIG. 3A, the initial drop shadow 311 has a shape that is substantially similar to that of the input element 312, such that the initial drop shadow 311 has a rounded rectangle shape and is offset to the right and down from a position of the input graphical element 312. However, the present disclosure is not limited thereto and the initial drop shadow 311 may, for example, be larger than the input graphical element (e.g., generating a drop shadow blurring and expanding the edges of a shape of the same size as the input graphical element), and/or may have portions extending up and/or to the left of the input graphical element 312, instead of (or in addition to) portions extending to the right and/or down from the input graphical element 312. In addition, while the initial drop shadow 311 is shown as having the same shape as the input graphical element 312, the disclosure is not limited thereto and includes drop shadows having other shapes that are based on the shape of the input graphical element. For example, the input graphical element 312 may have a rectangular shape with sharp corners and the drop shadow may have a rounded rectangular shape. More generally, the initial drop shadow 311 may have a shape that is computed based on parameters of the input graphical element, such as smoothing or blurring a shape or outline of the input graphical element 312.

Returning to FIG. 2A, in operation 230, the rendering engine generates a mask shape based on the graphical element, and in operation 250 generates a mask based on the mask shape.

Figure 2B:
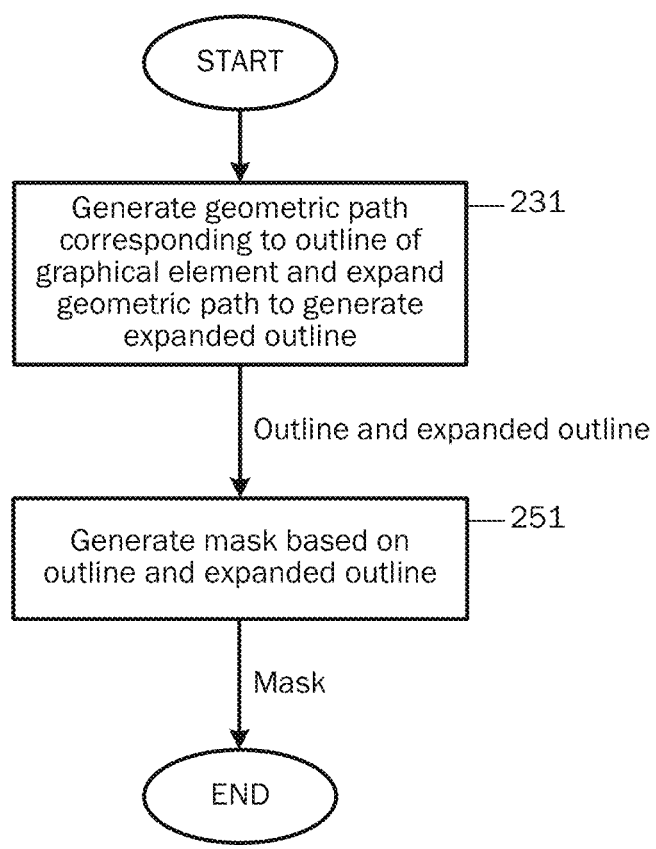
FIG. 2B is a flowchart depicting a method for generating a mask for a graphical element based on an outline of the graphical element according to one example of the present disclosure.
Figure 3B:
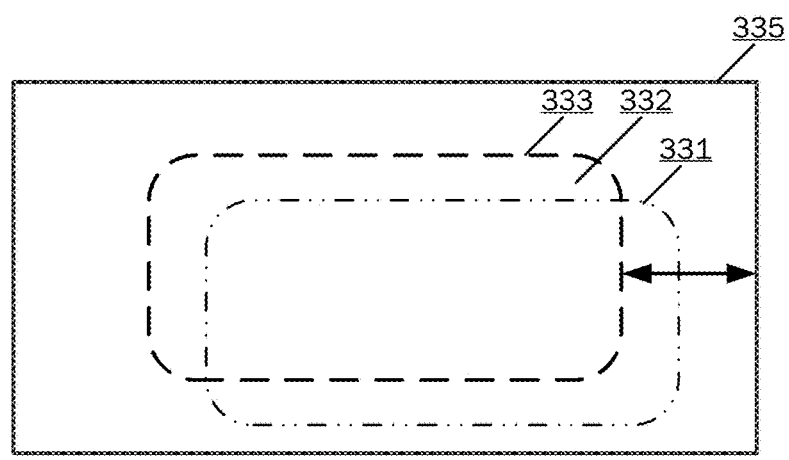
FIG. 3B illustrates generating an expanded outline of a graphical element according to one example of the present disclosure.

FIG. 2B is a flowchart depicting a method for generating a mask for a graphical element based on an outline of the graphical element according to one example of the present disclosure. In more detail, FIG. 2B depicts one example method for generating the mask based on a graphical element, as may be used to implement operations 230 and 250 of FIG. 2A. Referring to FIG. 2B, in operation 231, the rendering engine generates a geometric path corresponding to the outer boundary, border, or outline (for simplicity hereinafter collectively referred to as "outline") of the input graphical element and expands the geometric path to generate an expanded outline of the input graphical element, where the outer outline, together with the expanded outline, corresponds to the mask shape generated in operation 230 as shown in FIG. 2A, one example of which is shown in FIG. 3B. The input graphical element 332 has an outer outline 333, which is shown in FIG. 3B as a dashed line. In some examples, the generated outline 333 corresponds to an approximation or smoothing of an outer boundary of the graphical element 332, such as in a case where the outer boundary has a complex shape. The outline 333 is expanded or enlarged, as indicated by the double headed arrow, to form an expanded outline 335. The expanded outline 335 is sized and shaped such that it encompasses or surrounds at least both the external outline of the input graphical element 332 and the external outline of the drop shadow 331. In the arrangement shown in FIG. 3B, the expanded outline 335 is shown as having a rectangular shape with square corners. However, the present technology is not limited thereto and the expanded outline 335 may have another shape, such as a rounded rectangular shape, a circular shape, an oval shape, or the like. In some examples, the expanded outline 335 corresponds in shape to the outline 333 of the input graphical element 332, the outline of the drop shadow 331, or both (e.g., the outline of the union of the shapes of the input graphical element 331 and the drop shadow 331).

Figure 3C:
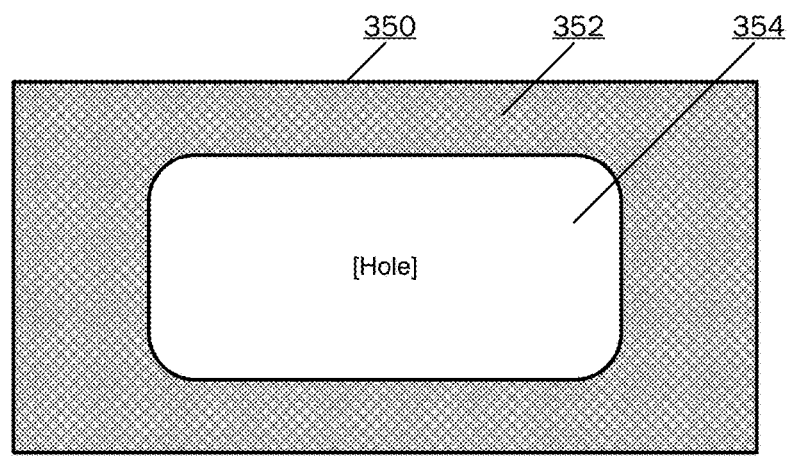
FIG. 3C illustrates generating a mask from the expanded outline of the graphical element according to one example of the present disclosure.

Returning to FIG. 2A, in operation 250, the rendering engine generates a mask based on the mask shape. In the example shown in FIG. 2B, the mask shape includes the expanded outline and the outline of the input graphical element. For instance, a mask is generated in operation 251 corresponding to the area or region between the outline of the input graphical element and the expanded outline (e.g., outline 333 and expanded outline 335 as shown in FIG. 3B). FIG. 3C illustrates a mask 350 generated from the expanded outline of the graphical element according to one example of the present disclosure, where the shaded portion 352 indicates the location of the mask (e.g., where the mask bits have a value of "1") and the unshaded portion 354 indicates a hole in the mask (e.g., where the mask bits have a value of "0") where the hole in the mask matches the geometry (e.g., outline) of the element casting the shadow (e.g., outline 333).

Figure 3D:
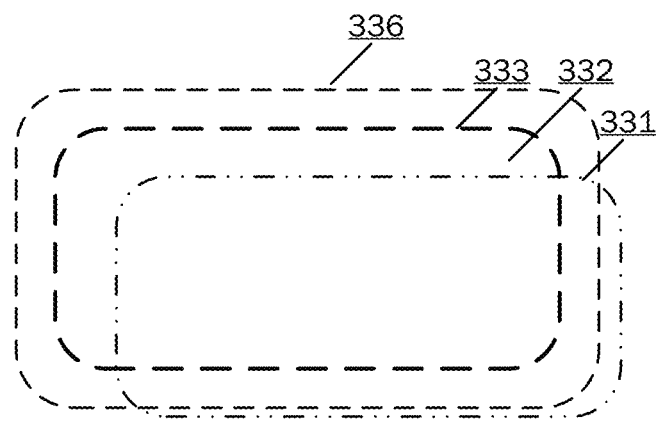
FIG. 3D illustrates generating an expanded outline of a graphical element according to one example of the present disclosure.
Figure 3E:
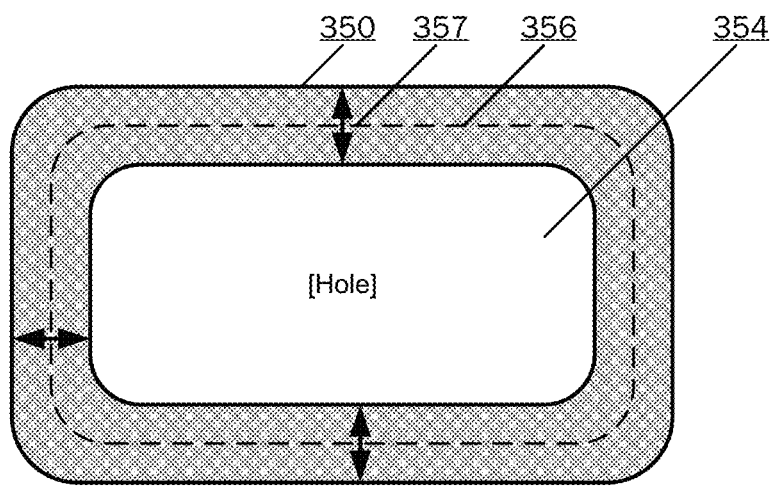
FIG. 3E illustrates generating a mask from applying a stroke to the expanded outline of the graphical element according to one example of the present disclosure.

Alternatively, in some examples, the rendering engine generates the mask in operation 250 based on applying a stroke to an expanded outline generated in operation 230. FIG. 3D illustrates generating an expanded outline of a graphical element according to one example of the present disclosure. FIG. 3E illustrates a mask generated from applying a stroke to the expanded outline of the graphical element according to one example of the present disclosure.

Referring to FIG. 3D, in some embodiments, the rendering engine generates the outline 333 of the graphical element 332 in operation 230 in a manner similar to that described above with respect to FIG. 3B, in addition to generating an expanded outline 336 that is used as a path for defining the mask. As shown in FIG. 3E, the rendering engine strokes a path defined by the expanded outline 356 (corresponding to the expanded outline 336 of FIG. 3D) with a particular stroke width 357, as indicated by the double headed arrow, to define the mask (e.g., where parts that are stroked have a mask bit of "1" and parts not covered by the stroke have a mask bit of "0" or where the stroked geometry defines a region that is to be filled with a visual effect such as a drop shadow). In some examples, the stroke width is twice the distance between the expanded outline 336 and the outline 333 of the graphical element. For example, if the expanded outline is an expansion of the outline of the graphical element by 4 pixels, then the stroke width is 8 pixels. This results in a stroked path that touches the outline of the graphical element, thereby defining a mask that surrounds the outside borders of the graphical element. The expanded outline 336 is defined in operation 230 such that stroking the expanded outline 336 as discussed above in accordance with the particular stroke width results in a mask that encompasses the drop shadow or visual effect to be rendered in association with the graphical element.

Figure 3F:
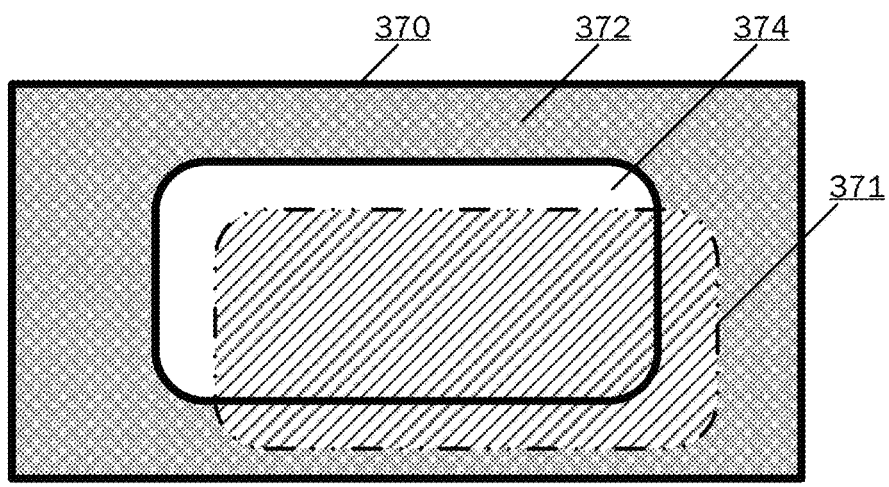
FIG. 3F and FIG. 3G illustrate masking a drop shadow according to one example of the present disclosure.
Figure 3G:
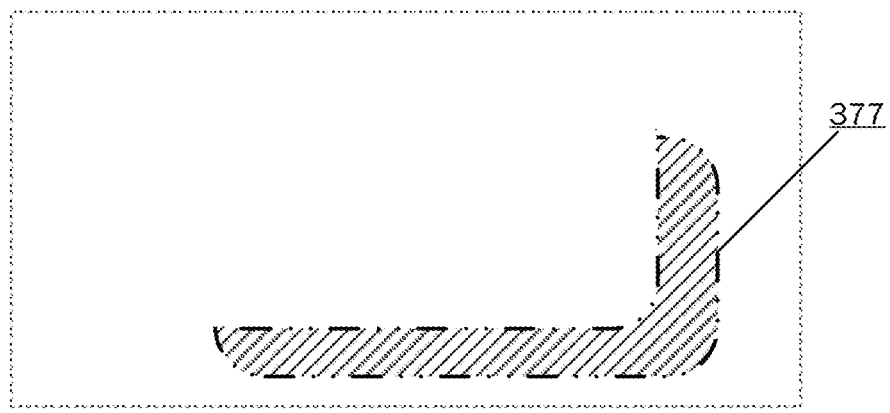

Returning to FIG. 2A, in operation 270, the rendering engine masks the visual effect (e.g., drop shadow) using the previously-generated mask to generate a masked visual effect. FIG. 3F and FIG. 3G illustrate masking a drop shadow according to one example of the present disclosure. As shown in FIG. 3F, the mask 370 is applied to drop shadow 371. Portions of the drop shadow 371 that overlap with the mask (e.g., the shaded portions 372) are masked and retained, while other portions that do not overlap with the mask (e.g., portions that overlap with the "hole" of the mask 374) are omitted from the resulting masked drop shadow 377, as shown in FIG. 3G.

Figure 3H:
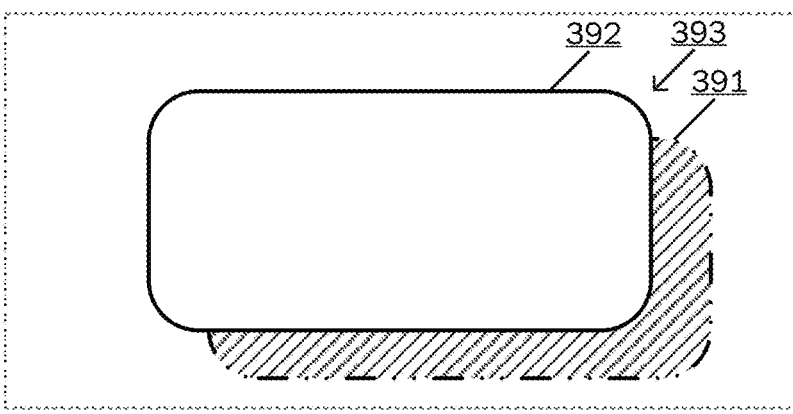
FIG. 3H illustrates compositing a masked drop shadow with a graphical element according to one example of the present disclosure.

Returning to FIG. 2A, in operation 290, the rendering engine combines the masked visual effect with the input graphical element to generate a combined graphical element with the visual effect now attached. FIG. 3H illustrates compositing a masked drop shadow 391 with a graphical element 392 according to one example of the present disclosure to generate the combined graphical element or composited graphical element 393. In some examples, the combined graphical element or composited graphical element 393, including both the graphical element 392 and the masked drop shadow 391, are stored in a same layer and rendered at a location corresponding to the graphical element, e.g., in a frame buffer for display on a video display (e.g., within a window of an application or as a separate window in a desktop environment).

By clipping the inner content area with a mask of the rendered visual effect, examples in accordance with the present disclosure reduce the complexity involved in compositing graphical elements of a graphical user interface of an application or a desktop environment because only one element (the combined graphical element with its attached visual effect) is rendered instead of two graphical elements (the graphical element and a separate visual effect cast onto a background layer). This enables visual effects like drop shadows to be added without requiring significant rewriting of a layout or architecture of a graphical software application. These examples also provide additional alternatives for displaying translucent or transparent elements with visual effects (e.g., where the visual effect is clipped or masked to remove the portions overlapping its associated graphical element, such that the visual effect is not visible through the associated graphical element).

Figure 3I:
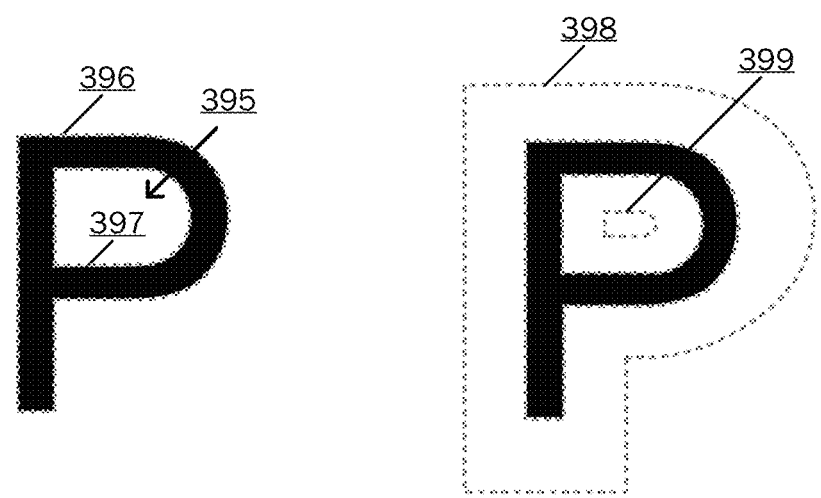
FIG. 3I illustrates a graphical element having a hole, along with an outer outline, an inner outline, an expanded outer outline, and an expanded inner outline for generating a mask for the graphical element according to one example.

While some examples of the present technology are described above in the context of generating a drop shadow (or other visual effect) for a graphical element by masking the visual effect based on an outline of the graphical element, the present technology is not limited thereto. For example, some examples of the present technology further relate to generating paths for internal boundaries or internal outlines of graphical elements (e.g., graphical elements with "holes") and expanding those internal boundaries or internal outlines (e.g., in a direction away from the graphical element and toward the center of the hole). FIG. 3I illustrates a graphical element having a hole, along with an outer outline, an inner outline, an expanded outer outline, and an expanded inner outline for generating a mask for the graphical element according to one example. As a concrete example, as shown in FIG. 3I, the shape of the letter "P" has a hole 395. In some examples of the present technology, when generating a mask for a drop shadow for a rendering of the letter "P," an outer outline 396 is formed, representing the outer boundary of the letter "P" and an inner outline 397 is also formed, representing the interior boundary surrounding the hole. The outer outline 396 is expanded (expanded outer outline 398) in a manner similar to that described above, such that it will encompass the drop shadow. Likewise, the inner outline 397 is expanded (expanded inner outline 399) toward the center of the hole 395 in the shape of the letter "P," thereby generating a mask that also allows the drop shadow (or other effect) to be visible through the hole in the shape of the letter "P."

Figure 4A:
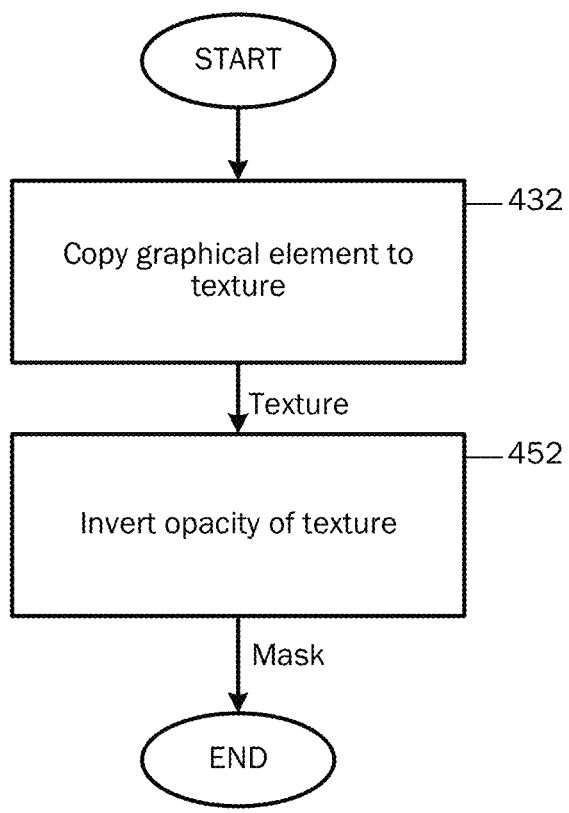
FIG. 4A is a flowchart depicting a method for generating a visual effect for a graphical element according to one example of the present disclosure.

FIG. 4A is a flowchart depicting a method for generating a mask for a graphical element according to one example of the present disclosure. The operations of method shown in FIG. 4A are examples of operations for creating a mask shape (see operation 230 of FIG. 2A) and to generate a mask from the mask shape (see operation 250 of the method 200 shown in FIG. 2A). FIGS. 4B through 4G illustrate stages of a method for generating a visual effect for a graphical element according to one example of the present disclosure. The method applied to generate the visual effect in the example of FIGS. 4B through 4G is substantially similar to the method 200 applied to generate the visual effect in the example of FIGS. 3A through 3H, apart from generating the mask (in operations 230 and 250 of FIG. 2A) based on the method shown in FIG. 4A instead of based on the method shown in FIG. 2B, as described in more detail below.

Figure 4B:
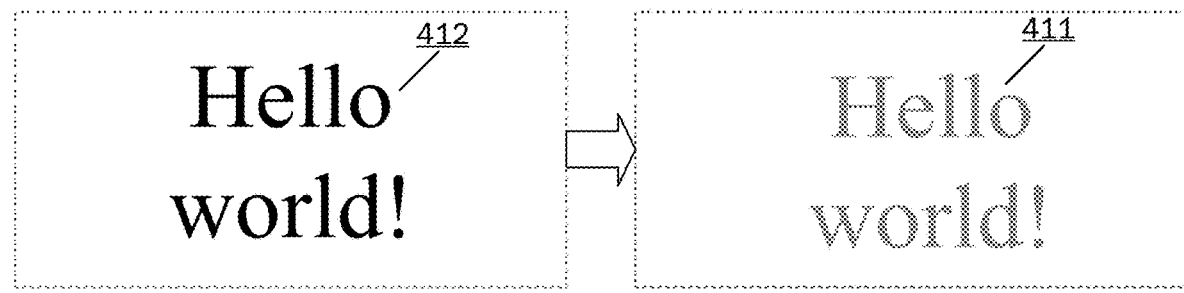
FIGS. 4B through 4G illustrate stages of a method for generating a visual effect for a graphical element according to one example of the present disclosure.
Figure 4C:

Referring back to FIG. 2A, in operation 210, the rendering engine generates a visual effect (e.g., a drop shadow) based on an input graphical element in a manner similar to that described above. FIG. 4B illustrates a drop shadow 411 generated for the graphical depiction of the text "Hello world!" as the input graphical element 412, where the drop shadow 411 shown in FIG. 4B has the same shape as the input graphical element 412, and is offset to the right and down.

Figure 4D:
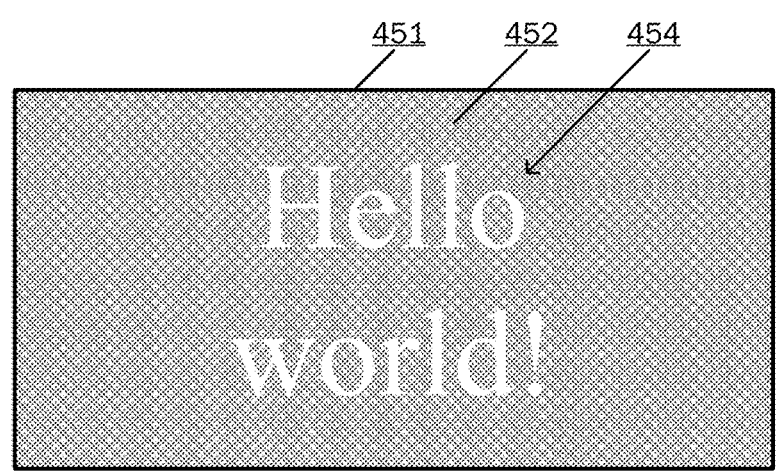

In some examples of the present technology, the mask is generated based on an inverted opacity of the graphical element. For example, the mask may be generated based on identifying the portions of the graphical element that are not completely transparent. For instance, in some examples, in operation 432 (corresponding to operation 230 of FIG. 2A), the rendering engine copies the graphical element to a texture 431 to generate the mask shape, and in operation 452, inverts the opacity (e.g., the alpha channel) of the texture to generate the mask, as shown in FIG. 4D, where dark portions of the texture 431 are opaque and white portions of the texture 431 are transparent. For example, the opacity of a layer may be expressed as a percentage, where 100% indicates an opaque layer (not transparent) and 0% indicates a completely transparent (e.g., invisible) layer, where the opacity of the layer at any given location in the layer may be described in an alpha channel or opacity map. In some examples, inverting the opacity of a texture relates to computing the value 100%−opacity %. For example, generating a mask shape for a graphical element having an opacity of 75% would result in a mask shape having an opacity of 25%. In some examples, a threshold parameter is also applied to specify a value above which the inverted mask is to be fully transparent. For example, if the threshold parameter was set to 80%, then any location in the alpha channel of the graphical element having opacity >80% will generate a corresponding location in the inverted mask with 0% opacity (instead of an opacity value ≤20%). In another example, the alpha of the mask shape (maskAlpha) may be calculated from the alpha of the graphical element (sourceAlpha) in accordance with:

$$\text{maskAlpha} = 100\% - (\text{sourceAlpha} \times (100\%/\text{threshold})) \quad (1)$$

where, if the calculated value is clamped to the range 0% to 100% (e.g., if the calculated maskAlpha goes below 0% or above 100%, then the value is restricted to 0% or 100% respectively).

As shown in FIG. 4D, shaded portions 452 of the mask 451 are used to select portions of the image to be masked, while unshaded portions 454 indicate holes in the mask where the image is not selected.

Figure 4E:
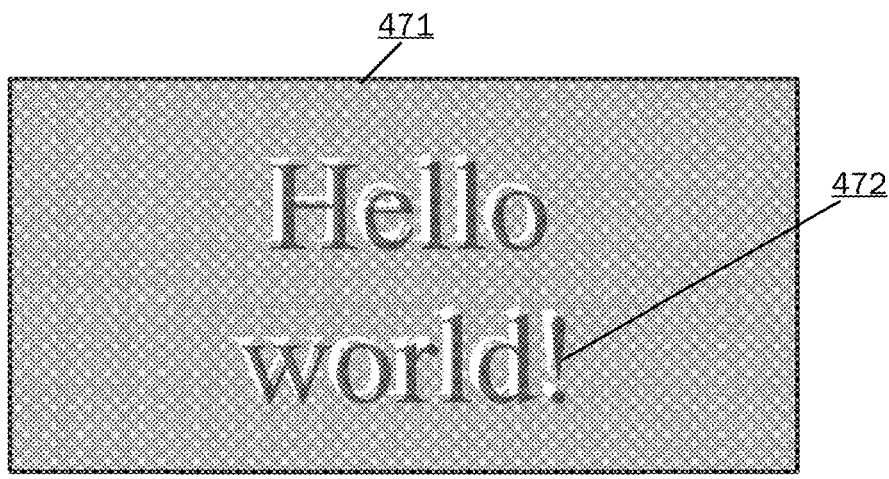
Figure 4F:

Referring back to FIG. 2A, in operation 270, the rendering engine applies the mask 471 to the generated visual effect 472, as shown in FIG. 4E. As shown in FIG. 4F, the portions of the visual effect 472 that overlapped with the holes in the mask 471 are removed, leaving only the parts of the visual effect that overlapped with the shaded portions of the mask 471.

Figure 4G:
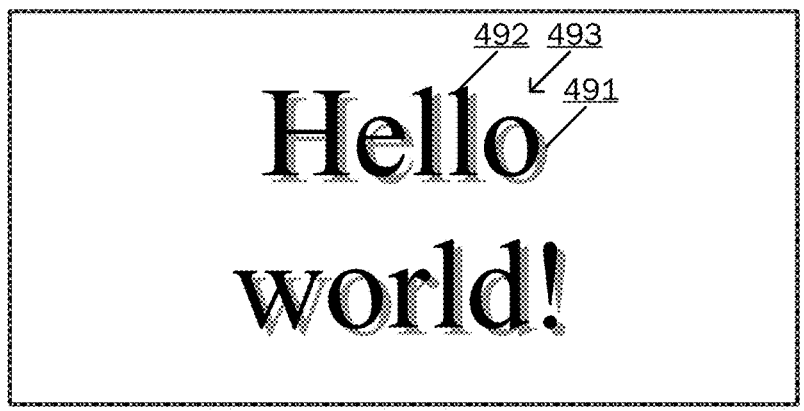

In operation 290, the rendering engine combines the masked visual effect with the input graphical element to generate a combined graphical element having an attached visual effect. FIG. 4G illustrates compositing a masked drop shadow 491 with a graphical element 492 according to one example of the present disclosure to generate the combined graphical element or composited graphical element 493.

While the present technology is described above in the context of drop shadows, the technology is not limited thereto and may also be applied to other visual effects that are attached to parent graphical elements. For example, glow or highlight effects may be visually similar to drop shadows, but may serve to highlight an element by surrounding the graphical element with a brightly colored border of a specified color instead of a darkened area. As another example, a bloom visual effect creates an illusion that the object is emitting light by surrounding the graphical element with a blurred and colored border having a color that is taken from the source graphical element. As a further example, an outline effect may create a color or gray border around the object with hard edges (e.g., as opposed to soft or blurred edges as typically found with shadow effects, highlight effects, glow effects, and bloom effects.

Figure 5:
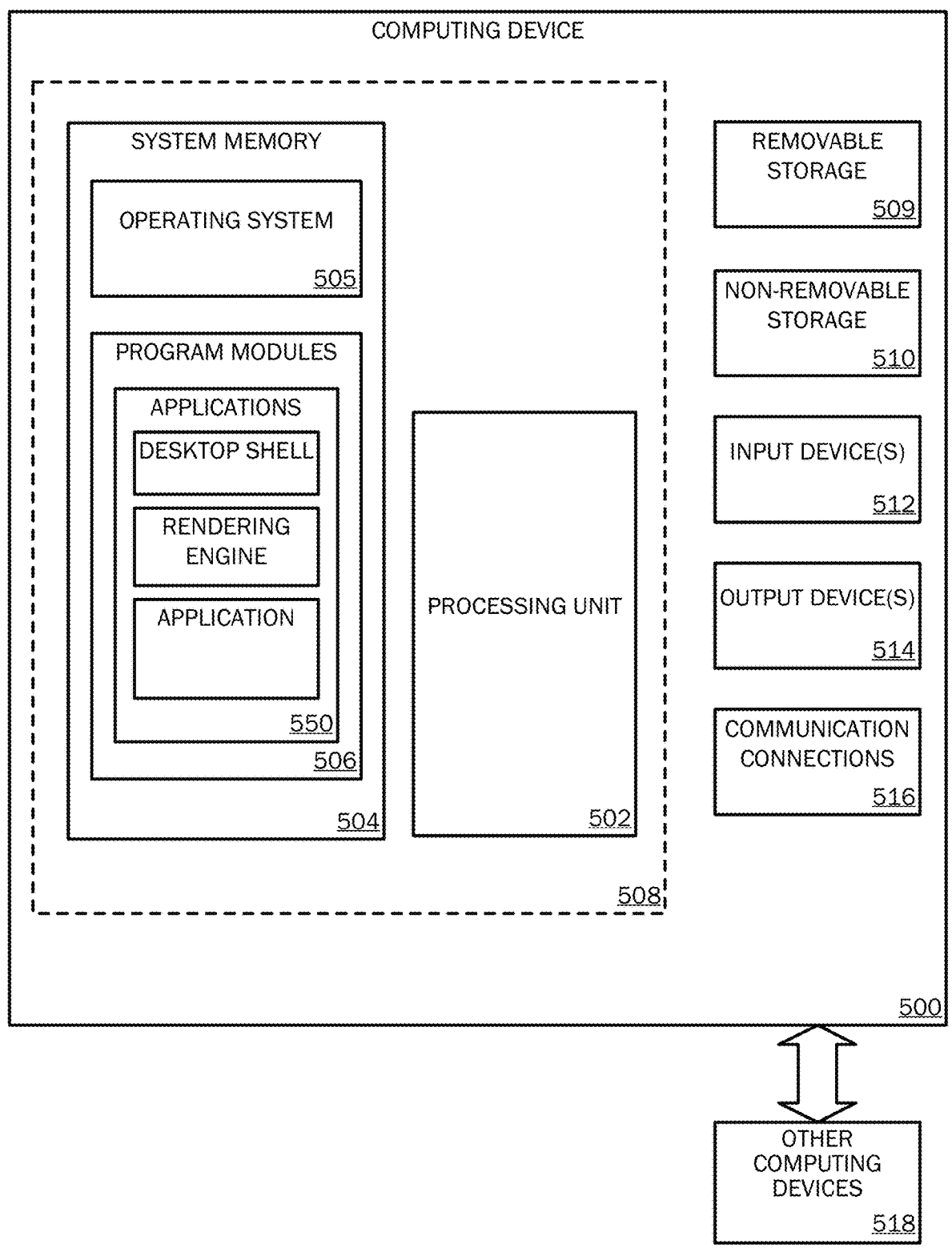
FIG. 5 is a block diagram illustrating example physical components of a computing device with which aspects of the present disclosure may be practiced.

FIGS. 5-7 and the associated descriptions provide a discussion of a variety of operating environments in which examples of the present technology may be practiced. However, the devices and systems illustrated and discussed with respect to FIGS. 5-7 are for purposes of example and illustration and are not limiting of a vast number of computing device configurations that may be utilized for practicing aspects of the present technology.

FIG. 5 is a block diagram illustrating physical components (i.e., hardware) of a computing device 500 with which examples of the present disclosure may be practiced. The computing device components described below may be suitable for a client device including a display for displaying visual effects rendered by a rendering engine as described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 such as a rendering engine, a desktop user interface shell, or an application. The operating system 505, for example, may be suitable for controlling the operation of the computing device 500. Furthermore, aspects of the present technology may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the stages of the methods 200 and 400 illustrated in FIGS. 2 and 4A. Other program modules that may be used in accordance with examples of the present disclosure and may include applications such as electronic mail and contacts applications, word processing applications, spreadsheet applications, database applications, slide presentation applications, and drawing or computer-aided application programs.

Furthermore, examples of the present disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating a visual effect attached to a graphical element, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects of the present disclosure may be practiced within a computer or in any other circuits or systems.

The computing device 500 may also have one or more input device(s) 512 such as a keyboard, a mouse, a pen, a sound input device, and a touch input device. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
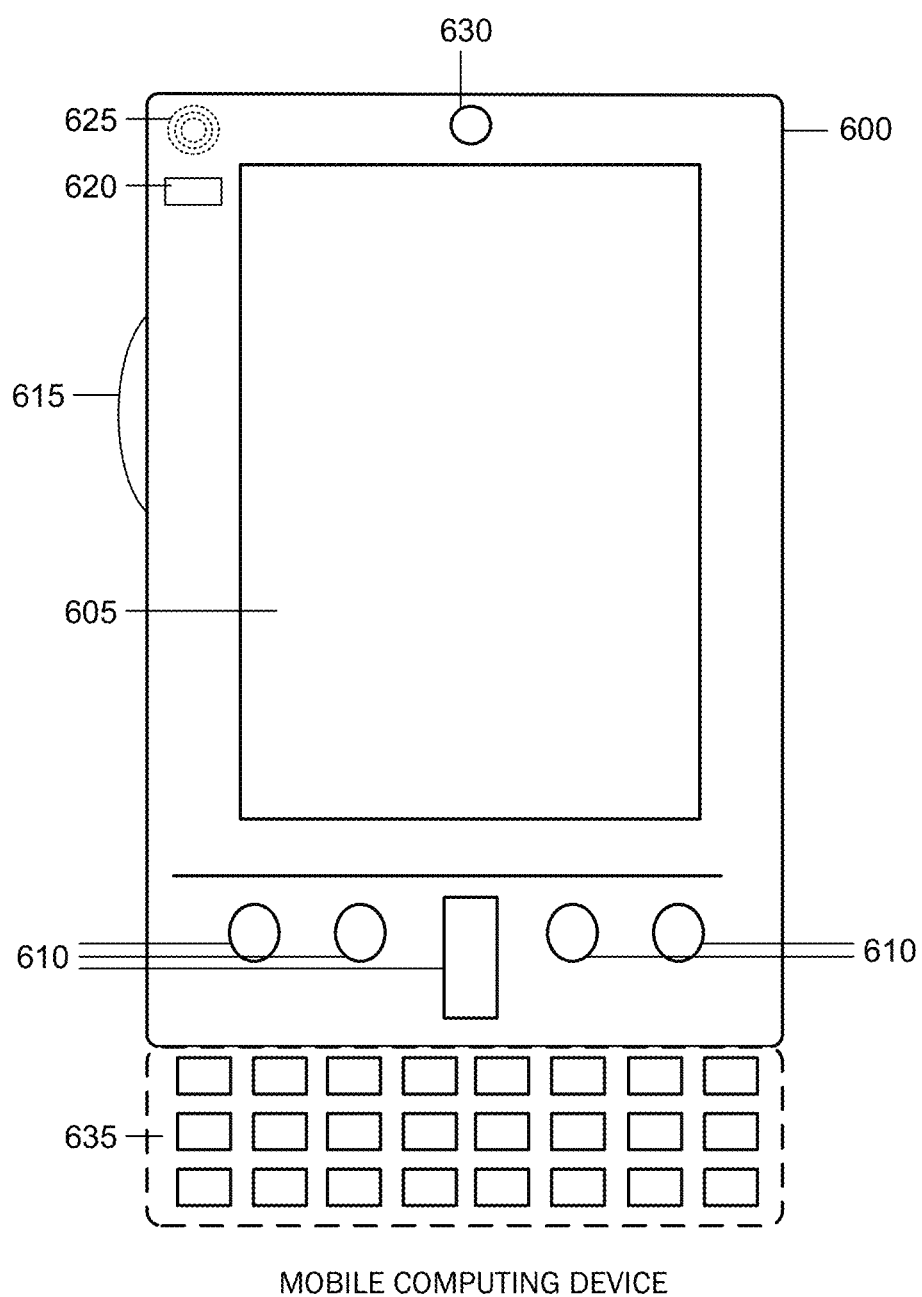
FIGS. 6A and 6B are simplified block diagrams of a mobile computing device with which aspects of the present disclosure may be practiced.
Figure 6B:
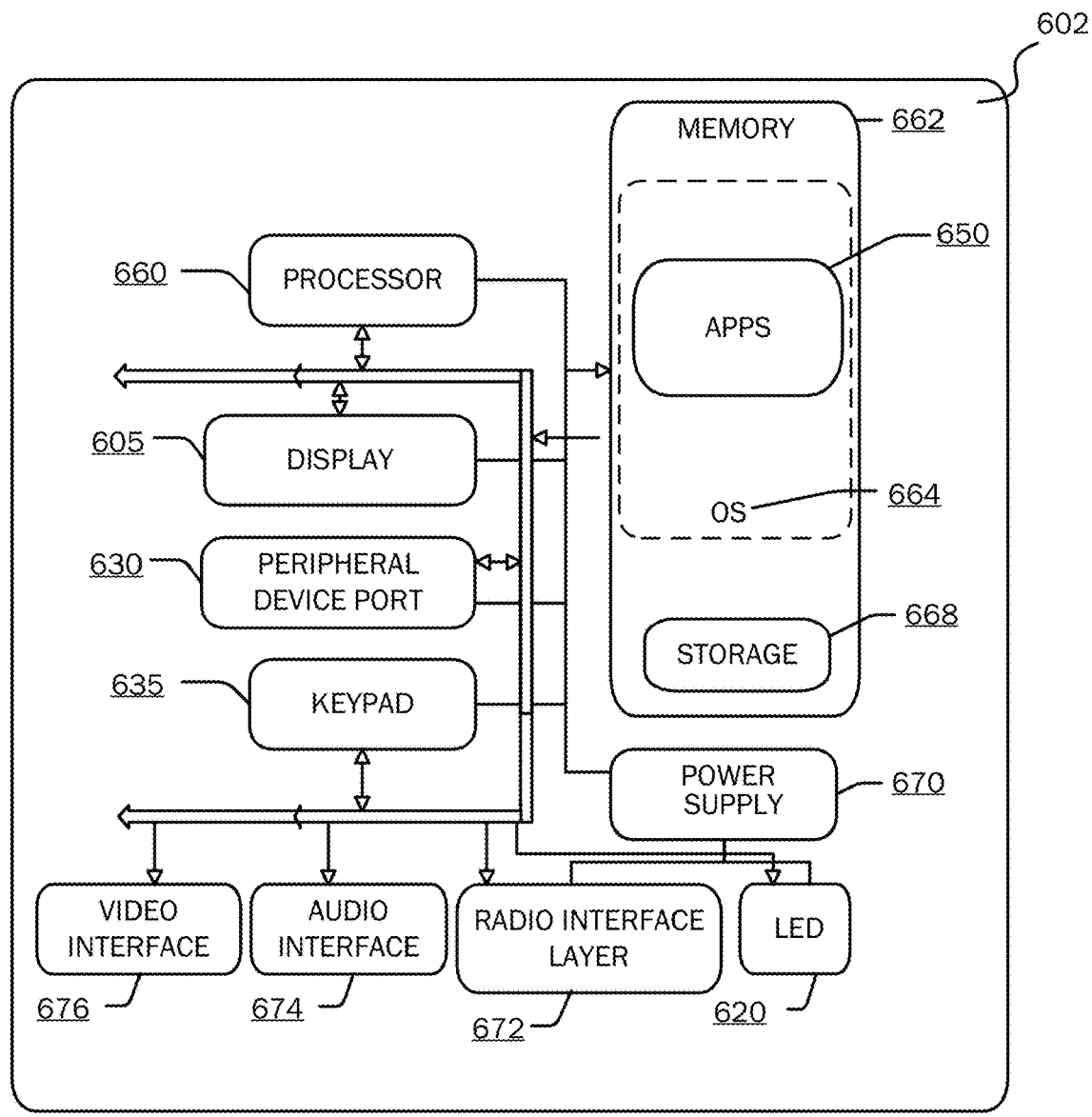

FIGS. 6A and 6B illustrate a mobile computing device 600, for example, a mobile telephone, a smart phone, a tablet personal computer, a laptop computer, and the like, with which aspects of the present technology may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In alternative examples, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 650 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 150 via the operating system 664, and vice versa.

The visual indicator 620 may be used to provide visual notifications and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

In one aspect, the technology relates to computer storage media having instructions stored thereon which, when executed by a computing device including a processor and memory, cause the computing device to: generate an initial visual effect based on a graphical element; compute a mask shape based on the graphical element; generate a mask based on the mask shape from the graphical element; mask the initial visual effect based on the mask to generate a masked visual effect; and combine the masked visual effect with the graphical element into a combined graphical element and visual effect.

In one example, the instructions to compute the mask shape based on the graphical element may include instructions which, when executed by the computing device, cause the computing device to: generate a geometric path corresponding to an outline of the graphical element; and expand the geometric path to generate an expanded outline, and the instructions to generate the mask based on the mask shape may include instructions which, when executed by the computing device, cause the computing device to generate the mask corresponding to a region between the geometric path and the expanded outline.

In another example, the instructions to compute the mask shape based on the graphical element may include instructions which, when executed by the computing device, cause the computing device to: generate a geometric path corresponding to an outline of the graphical element; and expand the geometric path to generate an expanded outline, and wherein the instructions to generate the mask based on the mask shape may include instructions which, when executed by the computing device, cause the computing device to stroke the expanded outline to define the mask.

In a third example, the instructions to compute the mask shape based on the graphical element may include instructions which, when executed by the computing device, cause the computing device to: copy the graphical element to a texture; and invert an opacity of the texture, and the instructions to generate the mask based on the mask shape include instructions which, when executed by the computing device, cause the computing device to generate the mask based on the texture.

The masked visual effect may be a drop shadow or may be a glow effect.

The graphical element may be translucent or transparent, and the masked visual effect may not be visible through the graphical element.

According to one aspect, the technology relates to a computer-implemented method for rendering a visual effect on a graphical element, the method including: generating an initial visual effect based on the graphical element; computing a mask shape corresponding to an outline of the graphical element; generating a mask based on the mask shape from the graphical element; masking the initial visual effect based on the mask to generate a masked visual effect; and combining the masked visual effect with the graphical element into a combined graphical element and visual effect.

In one example, computing the mask shape corresponding to the outline of the graphical element may include: generating a geometric path corresponding to the outline of the graphical element; and expanding the geometric path to generate an expanded outline, and the generating the mask based on the mask shape may include generating the mask corresponding to a region between the geometric path and the expanded outline.

In another example, the computing the mask shape corresponding to the outline of the graphical element may include: generating a geometric path corresponding to the outline of the graphical element; and expanding the geometric path to generate an expanded outline, and the generating the mask based on the mask shape may include stroking the expanded outline to define the mask.

In a third example, the computing the mask shape corresponding to the outline of the graphical element may include: copying the graphical element to a texture; and inverting an opacity of the texture, the texture defining the mask shape, and the generating the mask based on the mask shape may include generating the mask based on the texture.

The masked visual effect may be a drop shadow or a glow effect.

The graphical element may be translucent or transparent, and the masked visual effect may not be visible through the graphical element.

One aspect of the present technology relates to a system including: a processor; and memory storing instructions that, when executed by the processor, cause the system to perform a set of operations including: generating an initial visual effect having a shape corresponding to a shape of a graphical element; computing a mask shape based on the graphical element; generating a mask based on the mask shape from the graphical element; masking the initial visual effect based on the mask to generate a masked visual effect; and combining the masked visual effect with the graphical element into a combined graphical element and visual effect.

According to one example, the computing the mask shape based on the graphical element may include: generating a geometric path corresponding to an outline of the graphical element; and expanding the geometric path to generate an expanded outline, and the generating the mask based on the mask shape may include generating the mask corresponding to a region between the geometric path and the expanded outline.

According to another example, the computing the mask shape based on the graphical element may include: generating a geometric path corresponding to an outline of the graphical element; and expanding the geometric path to generate an expanded outline, and the generating the mask based on the mask shape may include stroking the expanded outline to define the mask.

According to a third example, the computing the mask shape based on the graphical element may include: copying the graphical element to a texture; and inverting an opacity of the texture, and the generating the mask based on the mask shape may include generating the mask based on the texture.

The masked visual effect may be a drop shadow.

The graphical element may be translucent or transparent, and the masked visual effect may not be visible through the graphical element.

Aspects of the present disclosure, for example, are described above with reference to block diagrams and/or operational illustrations of methods, systems, and computer program products according to aspects of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the present disclosure as claimed in any way.

The aspects, examples, and details provided in this application are considered sufficient to convey possession and enable others to make and use the best mode of claimed techniques. The claimed techniques should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed techniques.

We claim:

1. Computer storage media having instructions stored thereon which, when executed by a computing device comprising a processor and memory, cause the computing device to:
   generate an initial visual effect based on a graphical element;
   generate a mask having a hole, the hole matching a mask shape associated with the graphical element;
   mask the initial visual effect based on the mask, by omitting portions of the initial visual effect overlapping the hole of the mask, to generate a masked visual effect; and
   combine the masked visual effect with the graphical element into a combined graphical element and visual effect.

2. The computer storage media of claim 1 further having instructions to compute the mask shape associated with the graphical element which, when executed by the computing device, cause the computing device to:
   generate a geometric path corresponding to an outline of the graphical element; and
   expand the geometric path to generate an expanded outline, and
   wherein the instructions to generate the mask comprise instructions which, when executed by the computing device, cause the computing device to generate the mask corresponding to a region between the geometric path and the expanded outline.

3. The computer storage media of claim 1 further having instructions to compute the mask shape associated with the graphical element which, when executed by the computing device, cause the computing device to:
   generate a geometric path corresponding to an outline of the graphical element; and
   expand the geometric path to generate an expanded outline, and
   wherein the instructions to generate the mask comprise instructions which, when executed by the computing device, cause the computing device to stroke the expanded outline to define the mask.

4. The computer storage media of claim 1 further having instructions to compute the mask shape associated with the graphical element which, when executed by the computing device, cause the computing device to:
   copy the graphical element to a texture; and
   invert an opacity of the texture, and
   wherein the instructions to generate the mask comprise instructions which, when executed by the computing device, cause the computing device to generate the mask based on the texture.

5. The computer storage media of claim 1, wherein the masked visual effect is a drop shadow.

6. The computer storage media of claim 1, wherein the masked visual effect is a glow effect.

7. The computer storage media of claim 1, wherein the graphical element is translucent or transparent, and
   wherein the masked visual effect is not visible through the graphical element.

8. A computer-implemented method for rendering a visual effect on a graphical element, the method comprising:
   generating an initial visual effect based on the graphical element;
   generating a mask based on a mask shape associated with the graphical element;
   masking the initial visual effect based on the mask to generate a masked visual effect;
   combining the masked visual effect with the graphical element into a combined graphical element and visual effect; and
   rendering the combined graphical element and visual effect in a single layer.

9. The method of claim 8, further comprising:
   generating a geometric path corresponding to an outline of the graphical element; and
   expanding the geometric path to generate an expanded outline to compute the mask shape, and
   wherein the generating the mask comprises generating the mask corresponding to a region between the geometric path and the expanded outline.

10. The method of claim 8, further comprising:
    generating a geometric path corresponding to an outline of the graphical element; and
    expanding the geometric path to generate an expanded outline to compute the mask shape, and
    wherein the generating the mask comprises stroking the expanded outline to define the mask.

11. The method of claim 8, further comprising:
    copying the graphical element to a texture; and
    inverting an opacity of the texture, the texture defining the mask shape, and
    wherein the generating the mask comprises generating the mask based on the texture.

12. The method of claim 8, wherein the masked visual effect is a drop shadow.

13. The method of claim 8, wherein the masked visual effect is a glow effect.

14. The method of claim 8, wherein the graphical element is translucent or transparent, and
    wherein the masked visual effect is not visible through the graphical element.

15. A system comprising:
    a processor; and
    memory storing instructions that, when executed by the processor, cause the system to perform a set of operations comprising:
       generating an initial visual effect having a shape corresponding to a shape of a graphical element;
       generating a mask having a hole, the hole matching a mask shape associated with the graphical element;
       masking the initial visual effect based on the mask, by omitting portions of the initial visual effect overlapping the hole of the mask, to generate a masked visual effect; and combining the masked visual effect with the graphical element into a combined graphical element and visual effect.

16. The system of claim 15, wherein the memory further stores instructions that, when executed by the processor, cause the processor to:

generating a geometric path corresponding to an outline of the graphical element; and expanding the geometric path to generate an expanded outline to compute the mask shape, and wherein the generating the mask based on the mask shape comprises generating the mask corresponding to a region between the geometric path and the expanded outline.

17. The system of claim 15, wherein the memory further stores instructions that, when executed by the processor, cause the processor to:

generating a geometric path corresponding to an outline of the graphical element; and expanding the geometric path to generate an expanded outline to compute the mask shape, and wherein the generating the mask based on the mask shape comprises stroking the expanded outline to define the mask.

18. The system of claim 15, wherein the memory further stores instructions that, when executed by the processor, cause the processor to:

copying the graphical element to a texture; and inverting an opacity of the texture, the texture defining the mask shape, and wherein the generating the mask comprises generating the mask based on the texture.

19. The system of claim 15, wherein the masked visual effect is a drop shadow.

20. The system of claim 15, wherein the graphical element is translucent or transparent, and wherein the masked visual effect is not visible through the graphical element.

* * * * *